(12) United States Patent
Veronesi et al.

(10) Patent No.: US 8,446,986 B2
(45) Date of Patent: May 21, 2013

(54) METHOD OF ESTIMATING LOG-LIKELIHOOD RATIOS AND RELATIVE S-FSK RECEIVER

(75) Inventors: Daniele Veronesi, Aosta (IT); Lorenzo Guerrieri, Aosta (IT)

(73) Assignees: STMicroelectronics S.r.l., Agrate Brianza (MB) (IT); Dora S.p.A., Aosta (IT)

( * ) Notice: Subject to any disclaimer, the term of this patent is extended or adjusted under 35 U.S.C. 154(b) by 357 days.

(21) Appl. No.: 12/953,892

(22) Filed: Nov. 24, 2010

(65) Prior Publication Data

US 2011/0129040 A1 Jun. 2, 2011

(30) Foreign Application Priority Data

Nov. 27, 2009 (IT) .............................. VA2009A0076

(51) Int. Cl.
*H03D 3/00* (2006.01)
(52) U.S. Cl.
USPC ........... 375/334; 375/332; 375/316; 375/340; 375/341; 375/329
(58) Field of Classification Search
USPC .................... 375/334, 322, 316, 340, 341
See application file for complete search history.

(56) References Cited

U.S. PATENT DOCUMENTS

| | | | |
|---|---|---|---|
| 7,903,717 B2* | 3/2011 | Takahashi et al. | 375/130 |
| 2010/0091909 A1* | 4/2010 | Ericson et al. | 375/329 |
| 2010/0223534 A1* | 9/2010 | Earnshaw et al. | 714/780 |
| 2010/0316140 A1* | 12/2010 | Razazian et al. | 375/257 |
| 2011/0002400 A1* | 1/2011 | Guerrieri et al. | 375/257 |

FOREIGN PATENT DOCUMENTS

WO 2008/072604 6/2008

OTHER PUBLICATIONS

Anil Mengi et al: "Maximum-likelihood block decoding of noncoherent coded FSK for the Cenelec band" Power Line Communications and Its Applications, 2008. ISPLC 2008. IEEE International Symposium on, IEEE, Piscataway, NJ, USA, Apr. 2, 2008, pp. 117-122, XP031247880 ISBN: 978-1-4244-1975-3.

Schaub T: "Spread Frequency Shift Keying" IEEE Transactions on Communications, IEEE Service Center, Piscataway, NJ, US LNKD-DOI:10.1109/TCOMM. 1994. 580214, vol. 42, No. 2/03/04, Feb. 1, 1994, pp. 1056-1064, XP000447354.

(Continued)

*Primary Examiner* — Kenneth Lam
(74) *Attorney, Agent, or Firm* — Allen, Dyer, Doppelt, Milbrath & Gilchrist, P.A.

(57) ABSTRACT

A method of estimating log-likelihood ratios for first and second streams of samples of a received S-FSK signal demodulated using first and second carriers includes estimating channel and noise parameters associated with first and second transmitted values for the first and second streams of samples obtained from the received S-FSK modulated signal. Current signal-to-noise ratios are estimated for current samples of the first and second streams of samples obtained from the received S-FSK modulated signal using the channel and noise parameters. The estimated current signal-to-noise ratios are compared with values of a discrete ordered set and respective pairs of consecutive values of the discrete ordered set between which the estimated current signal-to-noise ratios are comprised are identified. Log-likelihood ratios are estimated for the current samples of the first and second streams.

17 Claims, 3 Drawing Sheets

OTHER PUBLICATIONS

Kokkinos E A M et al: "Narrowband incoherent threshold detection in non-additive Markov noise" Signal Processing, Elsevier Science Publishers B. V. Amsterdam, NL LNKD-DOI: 10. 1016/S0165-1684(98)00163-7, vol. 72, No. 1, Jan. 4, 1999, pp. 39-45, XP004151092.

Park B U et al: "Local likelihood estimation of truncated regression and its partial derivatives: Theory and applications" Journal of Econometrics, Elsevier Science, Amsterdam, NL LNKD-DOI: 10. 1016/J.JECONOM. Aug. 7, 2008, vol. 146, No. 1, Sep. 1, 2008, pp. 185-198, XP025467060.

Ilan Sharfer et al: "A Maximum Likelihood Digital Receiver Using Coordinate Ascent and the Discrete Wavelet Transform" IEEE Transactions on Signal Processing, IEEE Service Center, New York, NY, US, vol. 47, No. 3, Mar. 1, 1999, XP011058488.

* cited by examiner

FIG. 1

(PRIOR ART)

METHOD OF ESTIMATING LOG-LIKELIHOOD RATIOS AND RELATIVE S-FSK RECEIVER

FIELD OF THE INVENTION

The invention relates to digital communications, and, more particularly, to a method of estimating log-likelihood ratios and a receiver for Spread Frequency Shift Keying modulation.

BACKGROUND OF THE INVENTION

Spread Frequency Shift Keying (S-FSK) is a modulation and demodulation technique that combines some of the advantages of a classic spread spectrum system (for example, resistance against narrowband interferers) with the advantages of a classic FSK system (low-complexity).

In order to better understand this disclosure, a brief review of the S-FSK modulation is reported. An S-FSK transmitter includes a binary FSK transmitter in which the frequency deviation $f_d$ is large enough to generate a spectrum with two separate lobes. For this reason, the concept of dual channel is introduced: channel 0 refers to the signal placed around a frequency $f_0$ and channel 1 refers to the signal placed around a frequency $f_1$, with $f_d=(f_1-f_0)/2$. The symbols to be transmitted are generated with a rate 1/T, where T is the symbol period, and belongs to the alphabet $\{-1,+1\}$. Let $d_k$ be the symbol to be transmitted at the time instant kT and let $\chi_+$ and $\chi_-$ be the sets of indices where these symbols assume positive and negative values, respectively (i.e. $\chi_+=\{k:d_k=+1\}$ and $\chi_-=\{k:d_k=-1\}$). The transmitted signal is $$s(t) = \begin{cases} A\sin(2\pi f_0 t) & \text{if } \lfloor t/T \rfloor \in \chi_- \\ A\sin(2\pi f_1 t) & \text{if } \lfloor t/T \rfloor \in \chi_+ \end{cases} \quad (1)$$

where A is a real constant and $\lfloor a \rfloor$ is the integer part of a.

A frequency selective channel with an additive non-white Gaussian noise is considered; however, the channel gain $G_i$ and the noise power spectral density $N_i$ are assumed to be flat around the frequency $f_i$. Therefore, at the receiver input, the signal-to-noise ratio (SNR) for the channel i is:

$$\Gamma_i = \frac{A^2 G_i^2 / 2}{N_i / T}, \quad (2)$$

with $i \in \{0, 1\}$.

The SNRs defined in (2) adequately characterizes the quality of the received signal. Moreover, another characterization of the quality of the received S-FSK signal may be made through the unbalancing factor x and the average signal-to-noise ratio $\Gamma$. This last term is defined according to "Spread frequency shift keying," T. Schaub, *IEEE Trans. Commun.*, vol. 42, no. 2, pp. 1056-1064, February 1994 as the ratio of the signal energy and the average noise power densities. These parameters are related to (2) as follows:

$$\Gamma = 2 \cdot \frac{\Gamma_0 \cdot \Gamma_1}{\Gamma_0 + \Gamma_1} \quad (3)$$

and $$x = \frac{\Gamma_1}{\Gamma_0}.$$

Let us suppose that correct frame synchronization has been established with any technique and that it is helpful to discriminate at the receiver side whether a +1 or a −1 has been transmitted.

Figure 1:
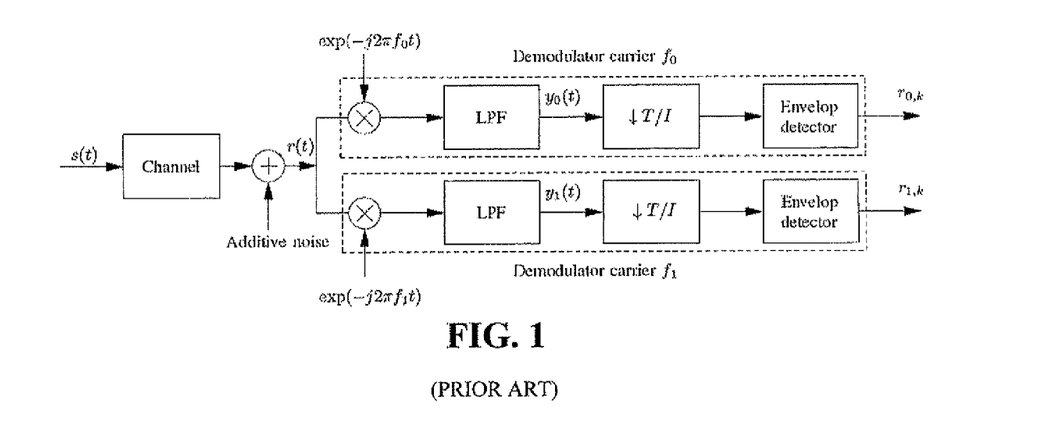
FIG. 1 is a block diagram of a classic S-FSK demodulator, in accordance with the prior art.

At the receiver side, the signal is processed along two different paths depicted in FIG. 1: on the first path, at the time t a multiplication by the complex exponential $\exp(-j2\pi f_0 t)$ is performed (corresponding to a frequency shift of $f_0$ Hz in the frequency domain); while, on the second path, a multiplication by the complex exponential $\exp(-j2\pi f_1 t)$ is performed. Successively, on each path the signal is filtered with a low-pass filter with cut-off frequency I/T/2, where I is the oversampling factor.

Hereinafter, without loosing generality, the low-pass filter LPF is assumed to be ideal. The filter output $y_i(t)$, with $i \in \{0, 1\}$, is sampled with a rate I/T and fed into an envelop detector, which is implemented with a weighed sum.

Let $\{\omega_n\}$ be the normalized weight coefficients $$\left( \sum_{n=0}^{I-1} \omega_n = 1 \right) \text{ with } E_\omega = \sum_{n=0}^{I-1} |\omega_n|^2.$$

The signal r fed into a receiver may be modeled as follows:

$$r_{0,k} = \begin{cases} |w_{0,k}| & \text{if } k \in \chi_+ \\ |w_{0,k} + A/\sqrt{2} \cdot G_0| & \text{if } k \in \chi_- \end{cases} \quad (4)$$

$$r_{1,k} = \begin{cases} |w_{1,k}| & \text{if } k \in \chi_- \\ |w_{1,k} + A/\sqrt{2} \cdot G_1| & \text{if } k \in \chi_+ \end{cases} \quad (5)$$

where $w_{i,k}$ is an additive circularly Gaussian noise with zero mean and variance $\sigma_i^2 = E_\omega N_i I/T$, with $i \in \{0,1\}$.

In the following analysis, the detailed receivers have the same structure. Let $\rho_i$ denote the value assumed by the signal $r_{i,k}$. The receiver elaborates $\rho_0$ and $\rho_1$ in order to detect which symbol has been transmitted. This operation is performed in two steps. In the first step, two decision values $\mu_{+1}(\rho_0,\rho_1)$ and $\mu_{-1}(\rho_0,\rho_1)$ are computed. Successively, accordingly to the higher decision value, the detected symbol $\hat{d}_k$ is:

$$\hat{d}_k = \begin{cases} +1 & \text{if } \mu_{+1}(\rho_0, \rho_1) > \mu_{-1}(\rho_0, \rho_1) \\ -1 & \text{elsewhere} \end{cases} \quad (6)$$

S-FSK receivers are based on equation (6), but they differ from each other in the way the decision values are computed. Generally, the decision values $\mu_{+1}(\rho_0,\rho_1)$ and $\mu_{-1}(\rho_0,\rho_1)$ are computed given the knowledge of the channel and the noise parameters, namely the channel gains $G_i$ and the noise variances $\sigma_i^2$.

Assuming knowledge of the first $L_{TS}$ symbols at the transmitter and at the receiver sides, which is typical in S-FSK systems, the channel and noise parameters may be estimated using the signals (4) and (5) as follows:

$$\hat{\sigma}_0^2 = \frac{1}{|\chi_+|} \sum_{k \in \chi_+} r_0(k)^2 \quad (7)$$

and $$\hat{\sigma}_1^2 = \frac{1}{|\chi_-|} \sum_{k \in \chi_-} r_1(k)^2$$

-continued $$\tilde{G}_0^2 = \left(-\tilde{\sigma}_0^2 + \frac{1}{|\chi_-|}\sum_{k\in\chi_-} r_0(k)^2\right) \cdot 2/A^2 \quad (8)$$

$$\tilde{G}_1^2 = \left(-\tilde{\sigma}_1^2 + \frac{1}{|\chi_+|}\sum_{k\in\chi_+} r_1(k)^2\right) \cdot 2/A^2 \quad (9)$$

wherein $\chi_+$ and $\chi_-$ contain indices related to the first $L_{TS}$ symbols only, $|\chi|$ is the cardinality of the set $\chi$ and $\tilde{\phi}$ is the estimation of the parameter $\phi$.

Once the noise variances and the channel gains are estimated, the SNRs defined in (2) or (3) are easily obtained. Furthermore, a reference value is introduced for each channel:

$$T_i^* = \sqrt{(A\tilde{G}_i/\sqrt{2})^2/4 + \tilde{\phi}_i^2}$$

This reference value is employed in the decision process.

Conventional FSK Detector

In order to give a comparison performance reference, a conventional FSK detector is detailed (see *Algorithms for communications system and their applications*," N. Benvenuto and G. Cherubini, New York: Wiley, 2003).

The computation of the two decision values is $$\mu_{+1}(\rho_0,\rho_1)=\rho_1 \text{ and } \mu_{-1}(\rho_0,\rho_1)=\rho_0 \quad (10)$$

while the decision rule is expressed by (6). Hereafter, this receiver is denoted with the label FSK.

S-FSK Receivers Proposed in the Literature

Let $I_0(\bullet)$ be the modified Bessel function of the first kind of order 0. As given in Schaub, when the transmitted symbol $d_k=-1$, the amplitude probability density function $h_{i|-}(\rho_i)$ of the signal $r_{i,k}$ with $i\in\{0,1\}$ is:

$$h_{0|-}(\rho_0) = \frac{2\rho_0}{\sigma_0^2} I_0\left(\frac{\rho_0 A G_0 \sqrt{2}}{\sigma_0^2}\right)\exp\left(-\frac{\rho_0^2 + (AG_0)^2/2}{\sigma_0^2}\right) \quad (11)$$

$$h_{1|-}(\rho_1) = \frac{2\rho_1}{\sigma_1^2}\exp\left(-\frac{\rho_1^2}{\sigma_1^2}\right) \quad (12)$$

being $h_{0|-}(\bullet)$ and $h_{1|-}(\bullet)$ the amplitude probability density function of the envelop detector output on channels 0 and 1, respectively, when the symbol $-1$ has been transmitted.

On the other hand, when $d_k=+1$, the amplitude probability density function $h_{i|+}(\rho_i)$ of the signal $r_{i,k}$ with $i\in\{0,1\}$ is:

$$h_{0|+}(\rho_0) = \frac{2\rho_0}{\sigma_0^2}\exp\left(-\frac{\rho_0^2}{\sigma_0^2}\right) \quad (13)$$

$$h_{1|+}(\rho_1) = \frac{2\rho_1}{\sigma_1^2} I_0\left(\frac{\rho_1 A G_1 \sqrt{2}}{\sigma_1^2}\right)\exp\left(-\frac{\rho_1^2 + (AG_1)^2/2}{\sigma_1^2}\right) \quad (14)$$

being $h_{0|+}(\bullet)$ and $h_{1|+}(\bullet)$ the amplitude probability density function of the envelop detector output on channels 0 and 1, respectively, when the symbol $+1$ has been transmitted. Note that $h_{i,\pm}(\rho_i)=0$ when $\rho_i<0$. Assuming the symbols $\{-1,+1\}$ to be transmitted with the same probability, the maximum likelihood decision may turn out to be the optimum decision rule. In particular, the decision rule (6) uses the following decision values:

$$\mu_{+1}(\rho_0,\rho_1)=h_{0|+}(\rho_0)\cdot h_{1|+}(\rho_1)$$

$$\mu_{-1}(\rho_0,\rho_1)=h_{0|-}(\rho_0)\cdot h_{1|-}(\rho_1) \quad (15)$$

Hereafter, this ideal receiver is denoted with the label Ideal. To practically implement the ideal receiver, the estimated channel and noise parameters may be used in the formulae from (11) to (15).

However, formulae from (11) to (15) are relatively complex and do not allow a direct practical implementation of the ideal decision rule. In order to obviate to this limitation, in Schaub, two suboptimal implementations are proposed.

First Prior Suboptimal Implementation

Let $r_{i,k}$ be quantized into the N intervals: $I_{i,1}, I_{i,2}, \ldots, I_{i,N}$ and let $\rho_i$ fall into the intervals $I_{i,J_i}$ with $i\in\{0,1\}$. The decision is taken according to (6) on the following decision values:

$$\mu_{+1}(\rho_0,\rho_1)=\nu_{+1}(\rho_0)+\nu_{+1}(\rho_1)$$

$$\mu_{-1}(\rho_0,\rho_1)=\nu_{-1}(\rho_0)+\nu_{-1}(\rho_1) \quad (16)$$

where $$\nu_{\pm 1}(\rho_i) = \log \int_{I_{i,J_i}} h_{i|\pm}(\rho)d\rho. \quad (17)$$

The values $\nu_\alpha(\rho_i)$, with $i\in\{0,1\}$ and $\alpha\in\{-1,+1\}$, are computed once the channel and the noise parameters are known. The practical implementation of (17) is, however, onerous. With a loss in performance, these decision values may be stored into a look-up table for a discrete set of channel parameters. Hereafter, this receiver is denoted with the label Real.1.

However, if the unbalancing factor x and the average signal-to-noise ratio $\Gamma$ vary over a large range of values, a quite substantial amount of memory is used to help guarantee a negligible loss in performance compared to (17).

Second Prior Suboptimal Implementation

Due to the memory drawback of the Real.1 implementation, in Schaub a second suboptimal receiver is detailed. The detection rule is still given in (6), while the decision values are computed as follows:

A) if $\tilde{x}>+\tau^*$ $$\mu_{+1}(\rho_0,\rho_1)=\rho_1 \text{ and } \mu_{-1}(\rho_0,\rho_1)=T_1^* \quad (18)$$

B) if $\tilde{x}<-\tau^*$ $$\mu_{+1}(\rho_0,\rho_1)=T_0^* \text{ and } \mu_{-1}(\rho_0,\rho_1)=\rho_0 \quad (19)$$

C) otherwise $$\mu_{+1}(\rho_0,\rho_1) = \frac{\rho_1}{\tilde{G}_1} \quad (20)$$

and $$\mu_{-1}(\rho_0,\rho_1) = \frac{\rho_0}{\tilde{G}_0}$$

where $\tau^*=4.77$ dB. Hereafter, this real receiver is denoted with the label Real.2. In the cases A) and B) a conventional amplitude shift keying (ASK) receiver is realized (see for instance Benvenuto et al. and K. S. Shanmugan, "*Digital and Analog Communication Systems*," New York: Wiley, 1979).

Unfortunately, the performance of the second sub-optimal approach is not satisfactory, in particular for values of the unbalancing factor x in the range [−10,10] dB.

SUMMARY OF THE INVENTION

A method of estimating the logarithmic likelihood ratio from a received S-FSK modulated signal, with a relatively small number of calculations, has now been found.

According to the method, channel and noise parameters, associated to the transmitted value −1 and the transmitted value +1, are estimated for the first stream and for the second stream of samples obtained from the received S-FSK modulated signal. Then current signal-to-noise ratios for the current samples of the first stream and of the second stream of samples are estimated and compared with the values of a discrete ordered set of values, identifying the respective pairs of consecutive values of the ordered set between which the current signal-to-noise ratios are comprised. Pre-computed coefficients related to the values of the natural logarithm of the modified Bessel function of the first kind of order zero in correspondence of values belonging to the discrete ordered set of values are made available in a look-up table. The log-likelihood ratios for the first stream and for the second stream are estimated using respective polynomial approximating functions defined on the current signal-to-noise ratio and on the coefficients stored in the look-up table corresponding to the pairs of consecutive values.

According to an embodiment, the approximating functions are linear. The method of estimating log-likelihood ratios may be used in a method of discriminating binary values in a received S-FSK modulated signal (s(t)).

All the methods herein disclosed may be implemented at least partially via a processor executing software stored in a non-transient processor readable medium, or in a hardware receiver of S-FSK modulated signals.

DETAILED DESCRIPTION OF THE PREFERRED EMBODIMENTS

In order to describe the proposed receiver, the log-likelihood ratio $l_i(\rho_i)$ of the signal $r_{i,k}$ fed into the receiver is introduced:

$$l_i(\rho_i) = \log(h_{i|+1}(\rho_i)/h_{i|-1}(\rho_i)) \text{ with } i \in \{0,1\}. \tag{21}$$

Using the distributions (11)-(14), (21) may be simplified into the following equation:

$$\ell_i(\rho_i) = (2i-1)\left\{\log\left[I_0\left(\frac{\rho_i A G_i}{\sigma_i^2 \sqrt{2}}\right)\right] - \frac{A^2 G_i^2}{2\sigma_i^2}\right\}. \tag{22}$$

Due to the presence of a logarithm and a Bessel function, (22) is very complex to be implemented. A very simple way of estimating log-likelihood ratios for a first stream ($r_{0,k}$) and a second stream ($r_{1,k}$) of samples of a received S-FSK signal (s(t)) demodulated using a first carrier ($f_0$) and a second carrier ($f_1$), has now been found.

According to an embodiment of the method, pairs of amplitude probability distribution functions, associated to the transmitted value −1 and the transmitted value +1, of samples obtained from the received S-FSK modulated signal of the first stream and of the second stream are calculated. As already explained, the channel and noise parameters used to calculate the amplitude probability distributions are estimated by transmitting a pre-established sequence of values +1 and −1 and to use equations (7) to (9).

According to an embodiment of the method, the log-likelihood ratios for the first stream and for the second stream are estimated using approximating functions defined on the current signal-to-noise ratios. Such approximating functions may be, for example, a polynomial obtained by truncating a Taylor's series expansion of the exact analytical formula of the log-likelihood ratio.

Another method of estimating the log-likelihood ratio is proposed hereinafter. Let g(•) be a piecewise linear approximation of the function log $I_0$(•) defined as:

$$g(a) = K_{e,1} + K_{e,2} \cdot a \tag{23}$$

The approximation is defined over M intervals $L_1$, $L_2$, ..., $L_e$, ..., $L_M$ and the affinity coefficients $K_{e,1}$ and $K_{e,2}$ are constants over the interval $L_e$. A suitable choice is $e = \lfloor \log_2(a) \rfloor^+ \forall a \in [0,+\infty)$, wherein $\lfloor \phi \rfloor^+$ denotes the nearest non negative integer of $\phi$ and $K_{e,1}$ and $K_{e,2}$ are calculated by imposing g(•) to be equal to log [$I_0$(•)], on the boundary of each interval that defines the piecewise approximation:

$$g(a) = \log[I_0(a)] \text{ with } a = 0, 2^1, 2^2, \tag{24}$$

The skilled reader will appreciate that other definitions of $K_{e,1}$ and $K_{e,2}$ are possible, depending on the values of a for which they are off-line calculated. For sake of example the values of a, for which the function $g(a) = \log[I_0(a)]$ is calculated, are 0 and an integer power of two, though the skilled reader will be capable of determining a different set of values for a according to user needs. Therefore, in no way can the illustrated choice be considered a limitation of the present invention.

It is worth noticing that the coefficients $\{K_{e,1}\}$ and $\{K_{e,2}\}$ do not depend on the channel parameters, and for this reason it is possible to compute them off-line. Moreover, to fulfill particular needs, the memorization format of said coefficients could be adjusted, i.e. other coefficients related to $\{K_{e,1}\}$ and $\{K_{e,2}\}$ by a bijective correspondence can be saved. For instance, to reduce the dynamic to the interval [−1,+1], the coefficients $\{K_{e,1}\}$ and $\{K_{e,2}\}$ could be normalized by the maximum of the absolute value of them.

One of skill in the art will also appreciate that variations of the function to be approximated can be envisaged without limiting the scope of the present invention. For example, to reduce the amplitude of the stored coefficients, the function to be approximated could be log [$I_0(a)$]/2.

Let us introduce a current signal-to-noise ratio $a_i = \rho_i A G_i \sqrt{2}/\sigma_i^2$ and an index of interval $e_i$ (a suitable choice can be $e_i = \lfloor \log_2(a_i) \rfloor^+$, with $i \in \{0,1\}$. Using (23) in (22), an approximated estimation of the log-likelihood ratio $l_i'(\rho_i)$ is obtained with the following equation:

$$\ell_i'(\rho_i) = (2i-1)\left[g(a_i) - \frac{A^2 G_i^2}{2\sigma_i^2}\right] \tag{25}$$

In Schaub, it has been shown that with the increasing of the absolute value of the unbalancing factor, the improvement of the Ideal decision on the ASK decision (on the best channel)

decreases. With the increasing of the unbalancing factor, the SNR on the best channel increases. For these reasons, at higher SNR values the Ideal decision may be substituted with the ASK decision. Hence, the introduced piecewise linear approximation (which is quite similar to the ideal solution) should to be valid over a limited range of SNRs. As a consequence, the memory required to store the coefficients $\{K_{e,i}\}$ may be limited by fixing the maximum value of the interval index e to a suitable value $\Omega$. The proposed receiver decides accordingly to (6) on the following metrics:

A) if $e_0 \leq \Omega$ and $e_i \leq \Omega$ $$\mu_{+1}(\rho_0,\rho_1)=l_1'(\rho_1) \text{ and } \mu_{-1}(\rho_0,\rho_1)=l_0'(\rho_0) \quad (26)$$

B) if $e_0 > \Omega$ and $e_0 > e_1$, same as (19)
C) if $e_1 > \Omega$ and $e_1 > e_0$, same as (18)
D) if $e_1 > \Omega$ and $e_1 = e_0$ $$\mu_{+1}(\rho_0,\rho_1)=\rho_1-T_1^* \text{ and } \mu_{-1}(\rho_0,\rho_1)=\rho_0-T_0^* \quad (27)$$

Simulation results have demonstrated that a good tradeoff between performance and complexity is obtained with $\Omega=8$. From here on, this receiver is referred with the label Real.3.

Figure 2:
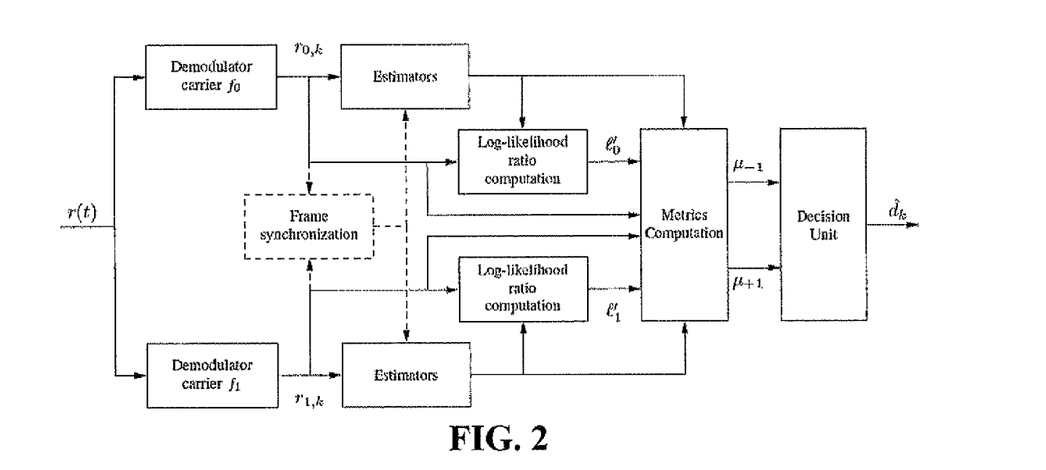
FIG. 2 is a high-level diagram of the circuit blocks of a S-FSK receiver with a circuit for estimating the log-likelihood ratios, in accordance with the present invention.

FIG. 2 depicts a block diagram of a S-FSK receiver. The received signal r(t) is demodulated according to S-FSK demodulation about a frequency $f_0$ and a frequency $f_1$, generating two streams of samples $r_{0,k}$ and $r_{1,k}$. The receiver includes a classic circuit for synchronizing the sampling instants of the received signal (FRAME SYNCHRONIZATION) with the incoming frame of digital data. Here we suppose an ideal synchronization.

Two similar circuit blocks ESTIMATORS estimate channel and noise parameters from the incoming stream of sampled data and the respective reference values. Two similar circuit blocks LOG-LIKELIHOOD RATIO COMPUTATION generate respective estimations of the log-likelihood ratio in function of the respective estimated parameters and of the respective sensed amplitude of the streams of samples, according to the novel method.

A circuit METRICS COMPUTATION calculates the decision parameters $\mu_{-1}, \mu_{+1}$ and a decision circuit DECISION UNIT generates the received symbol $\hat{d}_k$, preferably according to the method of discriminating binary values.

According to another embodiment, the received stream of samples of data are processed by a processor or a computer executing software that causes the processor or computer to carry out the disclosed method of estimating log-likelihood ratios, and a method of discriminating binary values in a received S-FSK signal. Preferably, the method of discriminating binary values implemented by the processor or computer executing the software, is the method herein disclosed.

To better appreciate advantages, we compare the proposed approach with the prior art. In a real implementation of the Real.1 solution, the decision values (17) are stored in two tables which need an amount of memory that is proportional to the number of quantization intervals N. Although a metric table is valid for a fixed pair of x and $\Gamma_i$, in Schaub it is shown that, for a given unbalancing factor x, the Real.1 receiver may operate with a minimum degradation with only three pairs of metric tables and with $N \geq 8$. For these reasons, in this analysis, the number of intervals is $N=12$, and the stored decision values are obtained for all the couples $(\Gamma_i, x)$, where $\Gamma_i \in \{0,3,6\}$ dB, $x \in \{0,1,2,\ldots,9,10\}$ dB and $i \in \{0,1\}$. Note that for the negative unbalancing factors, the decision values are swapped. Successively, once the channel parameters are estimated, the Real.1 receiver uses the stored decision values computed with the closest values of $(\Gamma_i, x)$.

In order to quantify the complexity of the detailed solutions, we evaluate its cost in terms of number of elementary operations (as sum). Given one interval partitioned into N sub-intervals and a generic value a, to detect which sub-interval contains a has a cost of N operations. Given two samples, the comparison of them or the product of them cost one operation each. Let a be a generic value expressed with a bit-true representation; the computation of $\lfloor \log_2(a) \rfloor^+$ is easily obtainable and it costs one operation only.

Using these rules, Tab.1 reports the memory occupation and the number of elementary operations required to detect one symbol.

TABLE 1

Complexity comparison among the different receivers.

| | Memory [byte] | Operations [number] |
|---|---|---|
| Real.1 | 720 | 26 |
| Real.2 | 5 | 4 |
| Real.3 | 20 | 11 |

From this analysis, it is clear that the solution Real.1 requires an amount of memory that is quite substantial compared to the other approaches. Since also the number of operations required by solution Real.1 is the highest, this approach turns out to be the more expensive. Furthermore, as it will be shown, the costs in terms of memory and complexity are not rewarded with a gain in performance. Focusing our analysis on the comparison between the solutions Real.2 and Real.3, it turns out that Real.3 solution is slightly more complex than Real.2. However, as it will be shown, in this case the costs in terms of memory and complexity are rewarded with a gain in performance.

Figure 3:
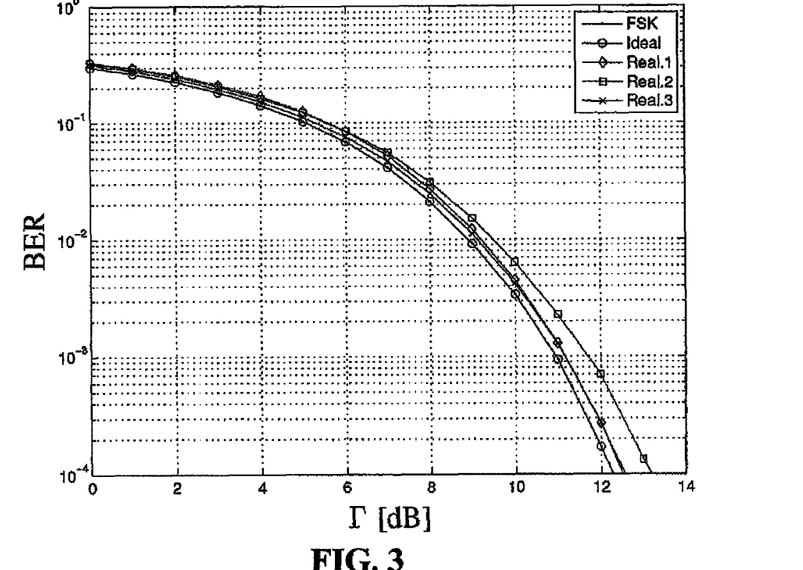
FIG. 3 compares the BER vs. Γ with x=0 dB, for various receivers.
Figure 4:
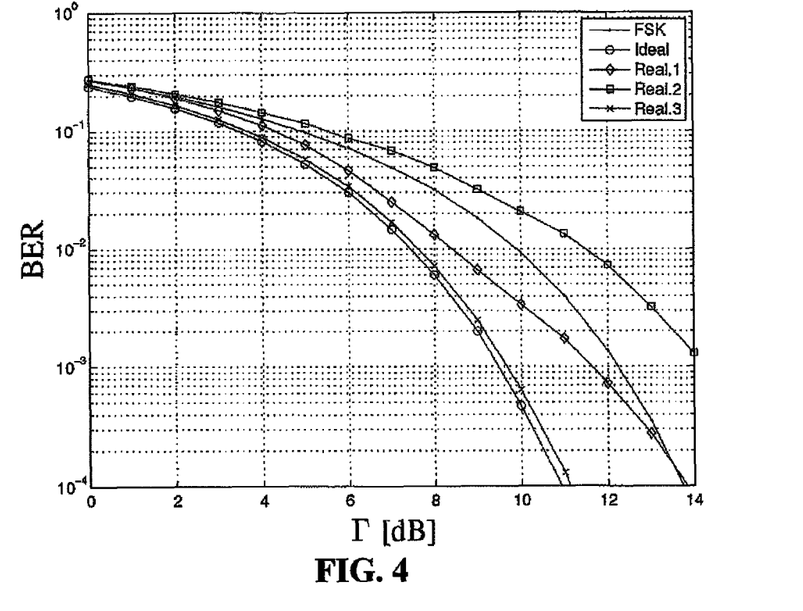
FIG. 4 compares the BER vs. Γ with x=−5 dB for various receivers.
Figure 5:
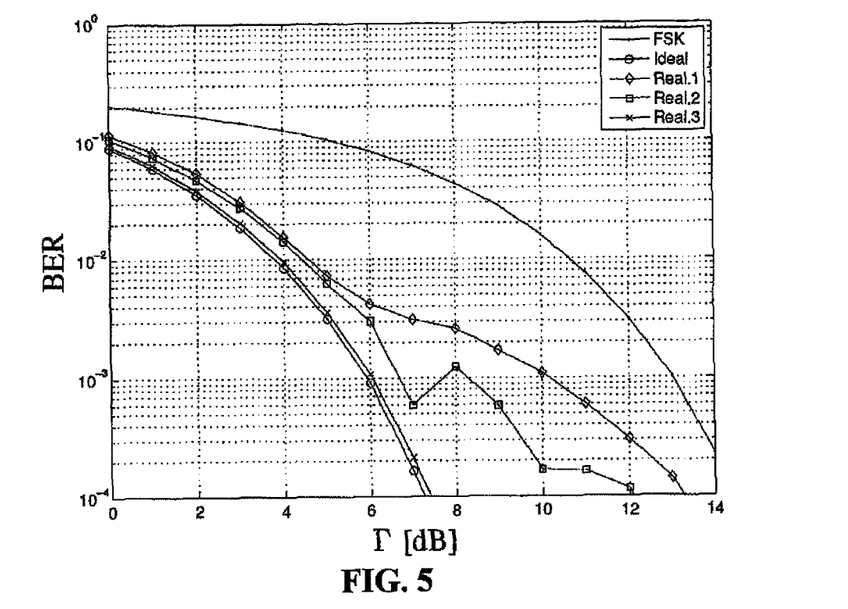
FIG. 5 compares the BER vs. Γ with x=−10 dB for various receivers.

The performance of the receiver is compared through numerical simulations with that of prior receivers. A packet-based transmission has been considered wherein each packet consists of a training sequence, with $L_{TS}=32$ and a payload of 1000 random bits. In all the following simulations the Real.1 receiver is implemented with the parameters detailed above. The oversampling factor is fixed to I=64, and the results of the following curves are averaged over 1000 packets. FIG. 3 to FIG. 5 show the bit error rate (BER) versus the average signal-to-noise ratio $\Gamma$, for three different unbalancing factors: $x=\{0,-5,+10\}$ dB.

The swing of the Real.2 curve, in the case of $x=+10$ dB with $5 \leq \Gamma \leq 10$ (FIG. 5), is due to the presence of a real channel estimator. In fact, when the channels are unbalanced, the estimator on the worst channel provides unreliable parameters. Hence, the estimated unbalancing factor may be wrong. As a consequence of that the decision values are computed with the wrong equation and therefore the detected bits become wrong.

Figure 6:
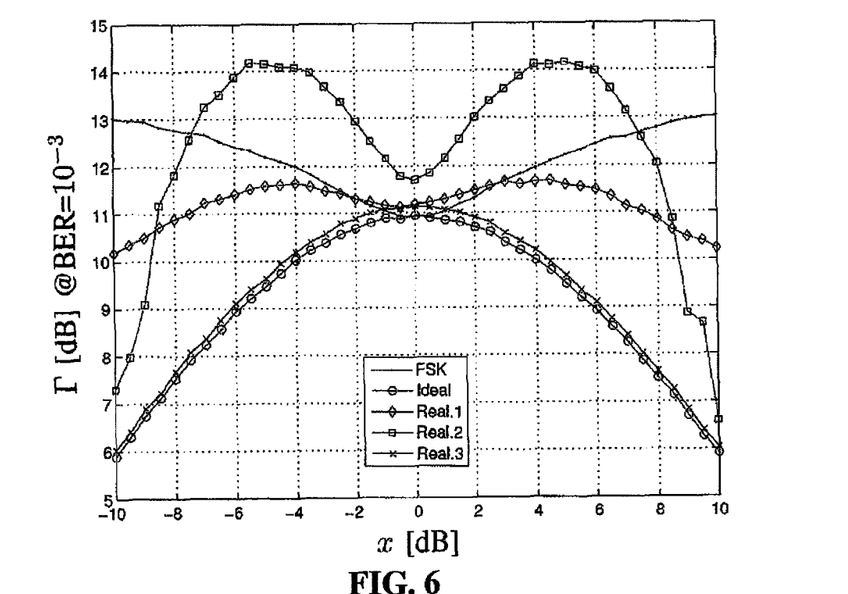
FIG. 6 is a graph representation of the required Γ to achieve the target BER=$10^{-3}$ vs. x dB, for different receivers.

From the previous figures, it is clear that the herein proposed receiver outperforms the previous approaches; however, the gain of our solution depends on the value of the unbalancing factor x. In order to quantify this gain, the average signal-to-noise ratio $\Gamma$ required to achieve a BER=$10^{-3}$ versus the unbalancing factor x is shown in FIG. 6.

The FSK receiver loses in performance with the increasing of the unbalancing factor; however, in the case of balanced channels, it represents the ideal solution. Indeed, the Ideal receiver has the same performance of the FSK receiver for $x=0$ dB.

The Real.2 receiver is the worst solution in the range of $|x| \leq 7$ dB; in fact, compared to the other receivers, it loses at least ½ dB when $|x|<1$ dB, and approximately 4 dB when $x=5$ dB. However, with an absolute value of the unbalancing factor higher than 6 dB, this approach tends to move closer to the performance of the Ideal receiver.

The Real.1 and Real.3 receivers perform similarly when the channels are almost balanced, i.e. |x|<2 dB. However, with the increasing of the unbalancing factor, the improvement of the Real.3 receiver on the Real.1 receiver becomes relevant: more than 3 dB, at x=−8 dB. Due to the presence of a real estimator, the Real.3 receiver has a loss in performance compared to the Ideal receiver, which may be considered negligible.

That which is claimed is:

1. A method of estimating log-likelihood ratios for a first stream and a second stream of samples of a received Spread Frequency Shift Keying (S-FSK) signal demodulated using a first carrier and a second carrier, respectively, samples of the first stream and of the second stream representing a same received binary value, comprising:
   estimating channel and noise parameters associated with a transmitted value −1 and a transmitted value +1, for the first stream and for the second stream of samples obtained from the received S-FSK modulated signal;
   estimating current signal-to-noise ratios for current samples of the first stream and of the second stream of samples obtained from the received S-FSK modulated signal using the channel and noise parameters;
   comparing the estimated current signal-to-noise ratios with values of a discrete ordered set and identifying respective pairs of consecutive values of the discrete ordered set between which the estimated current signal-to-noise ratios are comprised;
   estimating log-likelihood ratios for the current samples of the first stream and of the second stream using respective polynomial approximating functions defined based upon the current signal-to-noise ratios and based upon coefficients stored in a look-up table corresponding to the pairs of consecutive values of the discrete ordered set, the coefficients being related to values of a natural logarithm of a modified Bessel function of a first kind and of a zero order based upon values belonging to the discrete ordered set.

2. The method of claim 1, wherein the polynomial approximating functions are linear.

3. The method of claim 1, wherein the discrete ordered set of values comprises 0 and powers of 2 raised to an integer exponent.

4. A method of discriminating binary values in a received S-FSK modulated signal, comprising:
   generating a first stream and a second stream of samples of the received Spread Frequency Shift Keying (S-FSK) signal demodulated using a first carrier and a second carrier, samples of the first stream and of the second stream representing a same received binary value;
   estimating log-likelihood ratios for the first and second streams of samples by at least:
      estimating channel and noise parameters associated with a transmitted value −1 and a transmitted value +1, for the first stream and for the second stream of samples obtained from the received S-FSK modulated signal,
      estimating current signal-to-noise ratios for current samples of the first stream and of the second stream of samples obtained from the received S-FSK modulated signal using the channel and noise parameters,
      comparing the estimated current signal-to-noise ratios with values of a discrete ordered set and identifying respective pairs of consecutive values of the discrete ordered set between which the estimated current signal-to-noise ratios are comprised, and
      estimating log-likelihood ratios for the current samples of the first stream and of the second stream using respective polynomial approximating functions defined based upon the current signal-to-noise ratios and based upon coefficients stored in a look-up table corresponding to the pairs of consecutive values of the discrete ordered set, the coefficients being related to values of a natural logarithm of a modified Bessel function of a first kind and of a zero order based upon values belonging to the discrete ordered set;
   calculating for the first stream and for the second stream of samples respective reference values as combinations of the estimated channel and noise parameters;
   calculating for the current sample of the first and second stream respective decision values using the log-likelihood ratios and the reference values; and
   recognizing that a value +1 has been received when the decision value for the current sample of the second stream is greater than the decision value for the current sample of the first stream, otherwise recognizing that a value −1 has been received.

5. The method of claim 4, wherein the decision values are calculated by at least generating the decision value for the first stream equal to a negative value of the respective log-likelihood ratio and generating the decision value for the second stream equal to the respective log-likelihood ratio, based upon the current signal-to-noise ratios being at most equal to a threshold.

6. The method of claim 4, wherein the decision values are calculated by at least generating the decision values for each stream as a difference between the respective current sample and the respective reference value, based upon the current signal-to-noise rations being substantially equal to each other and both larger than a threshold.

7. The method of claim 4, wherein the decision values are calculated by at least generating the decision value for the smallest current signal-to-noise ratio equal to the reference value of the other stream and generating the decision value for the largest current signal-to-noise ratio equal to the respective current sample.

8. A receiver to receive Spread Frequency Shift Keying (S-FSK) modulated signals and comprising:
   a circuit adapted to generate a first stream and a second stream of samples of the received S-FSK signal demodulated using a first carrier and a second carrier, samples of the first stream and of the second stream representing a same received binary value;
   a discriminating circuit input with the first and second streams, and configured to at least:
      estimate log-likelihood ratios for the first and second streams of samples by at least:
         estimating channel and noise parameters associated with a transmitted value −1 and a transmitted value +1, for the first stream and for the second stream of samples obtained from the received S-FSK modulated signal,
         estimating current signal-to-noise ratios for current samples of the first stream and of the second stream of samples obtained from the received S-FSK modulated signal using the channel and noise parameters,
         comparing the estimated current signal-to-noise ratios with values of a discrete ordered set and identifying respective pairs of consecutive values of the discrete ordered set between which the estimated current signal-to-noise ratios are comprised, and estimating log-likelihood ratios for the current samples of the first stream and of the second stream using respective polynomial approximating functions defined based upon the current signal-to-noise ratios and based upon coefficients stored in a look-up table corresponding to the pairs of consecutive values of the discrete ordered set, the coefficients being related to values of a natural logarithm of a modified Bessel function of a first kind and of a zero order based upon values belonging to the discrete ordered set, calculating for the first stream and for the second stream of samples respective reference values as combinations of the estimated channel and noise parameters, calculating for the current sample of the first and second stream respective decision values and, using the log-likelihood ratios and the reference values, and recognizing that a value +1 has been received when the decision value for the current sample of the second stream is greater than the decision value for the current sample of the first stream, otherwise recognizing that a value −1 has been received.

9. The method of claim 8, wherein the decision values are calculated by at least generating the decision value for the first stream equal to a negative value of the respective log-likelihood ratio and generating the decision value for the second stream equal to the respective log-likelihood ratio, based upon the current signal-to-noise ratios being at most equal to a threshold.

10. The method of claim 8, wherein the decision values are calculated by at least generating the decision values for each stream as a difference between the respective current sample and the respective reference value, based upon the current signal-to-noise ratios being substantially equal to each other and both larger than a threshold.

11. The method of claim 8, wherein the decision values are calculated by at least generating the decision value for the smallest current signal-to-noise ratio equal to the reference value of the other stream and generating the decision value for the largest current signal-to-noise ratio equal to the respective current sample.

12. A nontransitory processor readable medium storing a processor executable instructions configured to cause the processor to:

estimate log-likelihood ratios for a first stream and a second stream of samples of a received Spread Frequency Shift Keying (S-FSK) signal demodulated using a first carrier and a second carrier, respectively, samples of the first stream and of the second stream representing a same received binary value, by at least estimating channel and noise parameters associated with a transmitted value −1 and a transmitted value +1, for the first stream and for the second stream of samples obtained from the received S-FSK modulated signal;

estimating current signal-to-noise ratios for current samples of the first stream and of the second stream of samples obtained from the received S-FSK modulated signal using the channel and noise parameters;

comparing the estimated current signal-to-noise ratios with values of a discrete ordered set and identifying respective pairs of consecutive values of the discrete ordered set between which the estimated current signal-to-noise ratios are comprised;

estimating log-likelihood ratios for the current samples of the first stream and of the second stream using respective polynomial approximating functions defined based upon the current signal-to-noise ratios and based upon coefficients stored in a look-up table corresponding to the pairs of consecutive values of the discrete ordered set, the coefficients being related to values of a natural logarithm of a modified Bessel function of a first kind and of a zero order based upon values belonging to the discrete ordered set.

13. The nontransitory processor readable medium of claim 12, wherein the polynomial approximating functions are linear.

14. The nontransitory processor readable medium of claim 12, wherein the discrete ordered set of values comprises 0 and powers of 2 raised to an integer exponent.

15. A method of estimating log-likelihood ratios for a first stream and a second stream of samples of a received Spread Frequency Shift Keying (S-FSK) signal demodulated using a first carrier and a second carrier, comprising:

estimating channel and noise parameters associated with a first transmitted value and a second transmitted value, for the first stream and for the second stream of samples obtained from the received S-FSK modulated signal;

estimating current signal-to-noise ratios for current samples of the first stream and of the second stream of samples obtained from the received S-FSK modulated signal using the channel and noise parameters;

comparing the estimated current signal-to-noise ratios with values of a discrete ordered set and identifying respective pairs of consecutive values of the discrete ordered set between which the estimated current signal-to-noise ratios are comprised; and estimating log-likelihood ratios for the current samples of the first stream and of the second stream.

16. The method of claim 15, wherein the polynomial approximating functions are linear.

17. The method of claim 15, wherein the discrete ordered set of values comprises 0 and powers of 2 raised to an integer exponent.

* * * * *

UNITED STATES PATENT AND TRADEMARK OFFICE
CERTIFICATE OF CORRECTION

PATENT NO. : 8,446,986 B2  
APPLICATION NO. : 12/953892  
DATED : May 21, 2013  
INVENTOR(S) : Veronesi et al.

Page 1 of 1

It is certified that error appears in the above-identified patent and that said Letters Patent is hereby corrected as shown below:

In the Claims:

| | |
|---|---|
| Column 11, Line 23 | Delete: "The method" <br> Insert: --The receiver-- |
| Column 11, Line 30 | Delete: "The method" <br> Insert: --The receiver-- |
| Column 11, Line 36 | Delete: "The method" <br> Insert: --The receiver-- |

Signed and Sealed this  
Twenty-seventh Day of August, 2013

Teresa Stanek Rea  
*Acting Director of the United States Patent and Trademark Office*